US008155315B2

(12) United States Patent
Reckless

(10) Patent No.: US 8,155,315 B2
(45) Date of Patent: Apr. 10, 2012

(54) APPARATUS FOR AND A METHOD OF DOWNLOADING MEDIA CONTENT

(75) Inventor: Jonny Boyd Reckless, Maidenhead (GB)

(73) Assignee: Rovi Solutions Corporation, Santa Clara, CA (US)

( * ) Notice: Subject to any disclaimer, the term of this patent is extended or adjusted under 35 U.S.C. 154(b) by 963 days.

(21) Appl. No.: 11/340,791

(22) Filed: Jan. 26, 2006

(65) Prior Publication Data
US 2007/0174639 A1    Jul. 26, 2007

(51) Int. Cl.
*G06F 21/00*    (2006.01)
(52) U.S. Cl. .................... 380/217; 380/216; 713/192
(58) Field of Classification Search .................. 713/193; 380/217
See application file for complete search history.

(56) References Cited

U.S. PATENT DOCUMENTS

| | | | | |
|---|---|---|---|---|
| 5,630,092 | A | * | 5/1997 | Carreiro et al. ............... 711/111 |
| 5,784,572 | A | * | 7/1998 | Rostoker et al. ............. 709/247 |
| 6,185,687 | B1 | | 2/2001 | Sako et al. |
| 6,523,113 | B1 | | 2/2003 | Wehrenberg |
| 6,853,727 | B1 | * | 2/2005 | Foster et al. .................. 380/239 |
| 7,228,422 | B2 | * | 6/2007 | Morioka et al. ............. 713/171 |
| 7,574,515 | B2 | * | 8/2009 | Fontijn et al. ................ 709/232 |
| 2002/0062290 | A1 | * | 5/2002 | Ricci ............................... 705/59 |
| 2002/0108043 | A1 | * | 8/2002 | Tanaka ........................... 713/176 |
| 2002/0164149 | A1 | * | 11/2002 | Wilkinson ....................... 386/46 |
| 2003/0053540 | A1 | * | 3/2003 | Wang et al. ............. 375/240.12 |
| 2003/0126445 | A1 | | 7/2003 | Wehrenberg |
| 2003/0229797 | A1 | | 12/2003 | Newman |
| 2004/0006696 | A1 | * | 1/2004 | Shin et al. ...................... 713/176 |
| 2004/0161108 | A1 | | 8/2004 | Ando et al. |
| 2004/0163031 | A1 | * | 8/2004 | Moriwaki ..................... 714/801 |
| 2004/0213547 | A1 | * | 10/2004 | Hayes .............................. 386/52 |
| 2004/0250009 | A1 | * | 12/2004 | Chen et al. .................... 711/103 |
| 2005/0089093 | A1 | | 4/2005 | Su et al. |

(Continued)

FOREIGN PATENT DOCUMENTS

EP       1 501 022 B1       9/2008
(Continued)

OTHER PUBLICATIONS

Dictionary.com, Definition of MPEG.*
(Continued)

*Primary Examiner* — Edan Orgad
*Assistant Examiner* — Brian Olion
(74) *Attorney, Agent, or Firm* — Morrison & Foerster LLP

(57) ABSTRACT

A data file reproduction system has a data file supplying apparatus that extracts video data and audio data from a received data file, compresses the extracted video and audio data and produces a compressed data file containing the compressed audio and video data together with meta data or navigation data determined from the received data file for enabling navigation of the original data file. The compressed data file is then copy-protected. Upon request, the copy-protected compressed data file is communicated to a reproduction apparatus. The reproduction apparatus decompresses the compressed audio and video data of the received copy-protected compressed data file, encodes the decompressed audio and video data and produces a copy-protected reconstituted data file containing the encoded audio and video data together with the meta or navigation data determined from the copy-protected compressed data file, so enabling navigation of the copy-protected reconstituted data file in the same manner as the original data file.

21 Claims, 12 Drawing Sheets

U.S. PATENT DOCUMENTS

| | | | |
|---|---|---|---|
| 2005/0141861 A1* | 6/2005 | Dunbar et al. | 386/68 |
| 2005/0185926 A1 | 8/2005 | Basile et al. | |
| 2005/0229212 A1 | 10/2005 | Kuether et al. | |
| 2005/0249350 A1 | 11/2005 | Kahn et al. | |
| 2005/0259546 A1 | 11/2005 | Basile et al. | |
| 2006/0008256 A1 | 1/2006 | Khedouri et al. | |
| 2006/0034300 A1* | 2/2006 | Barzegar et al. | 370/401 |
| 2006/0117379 A1* | 6/2006 | Bennett et al. | 726/3 |
| 2006/0132855 A1* | 6/2006 | Dokuni et al. | 358/448 |
| 2006/0291506 A1* | 12/2006 | Cain | 370/486 |
| 2010/0159008 A1 | 6/2010 | Barron et al. | |

FOREIGN PATENT DOCUMENTS

| | | |
|---|---|---|
| GB | 2366969 A | 3/2002 |
| GB | 2398671 A | 8/2004 |
| WO | WO 02/11136 A1 | 2/2002 |
| WO | WO 02/43396 A2 | 5/2002 |
| WO | WO 2004/066294 A1 | 8/2004 |
| WO | WO 2005020068 A2 | 3/2005 |

OTHER PUBLICATIONS

Asai, K. Nishikawa, H; Kudo, D; Divakaran, A, MPEG-7 Meta-Data Enhanced Encoder System for Embedded Systems, Mitsubishi Electric Research Laboratories.*

"How File Compression Works", howstuffworks.com pp. 1-3.*

"Lossless and lossy compression", 2004, SeachCio-midmarket.com, pp. 1-4.*

"*DVD Technical Guide-Chapter 4 Video Format-4.1 Video Format Overview/4.2 VMG*" downloaded on Jan. 17, 2006 from http://www.pioneer.co.jp/crdl/tech/dvd/4-e.html.

"*Welcome to ratDVD—the DVD movie download format*" downloaded on Jul. 27, 2005 from http://www.ratdvd.dk/faq.htm.

"*DVD Demystified Glossary*" downloaded on Jan. 17, 2006 from http://dvddemystified.com/glossary.html.

Zhu, et al., "Multimedia Authentication and Watermarking", Multimedia Information Retrieval and Management Technological Fundamentals and Applications Series : Signals and Communication Technology 2003 [retrieved Jul. 25, 2007] Retrieved from the Internet.<URL : http://research.microsoft.com/users/binzhu/Papers/ch07_zhu_final_corrected.pdf>.

International Search Report for International applicaction No. PCT/US 07/00798, mailed Feb. 21, 2008, 2 pages.

Supplementary European Search Report for Application No. EP 07 70 9728 completed Sep. 23, 2009, 1 page.

European Examination Report mailed on May 28, 2010, for European Patent Application No. 07709728.5, filed on Jan. 10, 2007, six pages.

Written Opinion mailed on Feb. 21, 2008, for PCT Application No. PCT/US07/00798, filed on Jan. 10, 2007, six pages.

* cited by examiner

APPARATUS FOR AND A METHOD OF DOWNLOADING MEDIA CONTENT

FIELD OF THE INVENTION

This invention relates to an apparatus for and a method of downloading multimedia content, in particular but not exclusively film or movie multimedia content.

BACKGROUND OF THE INVENTION

More and more homes have access to the Internet via a broadband connection. Broadband connection speeds of 1 to 4 megabits per second are commonplace and are increasing with it being likely that connection speeds of 16 megabits per second or more will be widely available in the near to medium term.

The market for DVDs (Digital Versatile Discs) carrying DVD multimedia data files comprising, for example, films (movies) music videos or the like has increased significantly in recent years. DVD multimedia data files are, of course, much larger than music data files so that, for example, it may take five, six or more hours to download a complete DVD multimedia disc image file. Given the popularity of music data file downloading, it is likely that the ability to download DVD multimedia data files would prove popular, if the download time was reasonable, for example less than an hour to download a complete DVD multimedia data file.

One way to reduce the download time for a DVD multimedia data file is to further compress the data beyond that which it is compressed in native DVD format. However, such compression will generally detrimentally affect the navigation and interactive features of the DVD multimedia data files so that, for example, the compressed DVD multimedia data file would no longer enable a user to navigate through the DVD multimedia data file to select special features provided within the DVD multimedia data file or to select a particular chapter or sequence of scenes of the DVD multimedia data file, or to select one of a multitude of audio streams (audio languages) or sub picture streams (subtitles).

Another issue is that the compressed DVD multimedia data file would generally have been downloaded to a user's personal computer which will generally have inferior audio visual capabilities to the user's home cinema or home entertainment system and, moreover, would probably not be positioned in the location in which the user prefers to watch films, music videos and the like.

A further issue is that of ensuring that the copyright owner is appropriately recompensed for the use made of downloaded material which means preventing or inhibiting production of direct digital copies ("ripping") of downloaded DVD multimedia data files.

SUMMARY OF THE INVENTION

In one aspect the present invention provides apparatus for downloading DVD multimedia data files that enables an authorised or licensed user to reproduce the DVD multimedia data file in a manner which retains its navigation capabilities whilst inhibiting unauthorised or unlicensed direct digital copying ("ripping") of the multimedia DVD multimedia data file.

In one aspect, the present invention provides a compressed data file supplying apparatus for supplying a compressed data file to at least one reproduction apparatus. The data file supplying apparatus comprises a receiver operable: to receive a data file comprising audio and video data and meta or navigation data for enabling navigation of the data file and a data processor operable: to extract various different types of data (for example video, audio, sub-picture, and the navigation or meta data); to compress the extracted data to produce a compressed data file; and to copy protect the compressed data file. A communicator is operable to communicate a copy-protected compressed data file to a reproduction apparatus upon request, In one aspect, the present invention provides a reproduction apparatus comprising a communicator operable to request a copy-protected compressed data file from a supplying apparatus and a data processor operable: to decompress the various types of compressed data; to encode the decompressed data; and to produce a copy-protected reconstituted data file containing the encoded audio and video data together with the determined navigation or meta data for enabling navigation of the copy-protected reconstituted data file in the same manner as the original data file.

In one aspect, the present invention provides a data file reproduction system having a data file supplying apparatus that extracts video data and audio data from a received data file, compresses the extracted video and audio data and produces a compressed data file containing the compressed audio and video data together with meta data or navigation data determined from the received data file for enabling navigation of the original data file. The compressed data file is then copy-protected. Upon request, the copy-protected compressed data file is communicated to a reproduction apparatus. The reproduction apparatus decompresses the compressed audio and video data of the received copy-protected compressed data file, encodes the decompressed audio and video data and produces a copy-protected reconstituted data file containing the encoded audio and video data together with the meta or navigation data determined from the copy-protected compressed data file, so enabling navigation of the copy-protected reconstituted data file in the same manner as the original data file.

BRIEF DESCRIPTION OF THE DRAWINGS

Embodiments of the present invention will now be described, by way of example, with reference to the accompanying drawings, in which.

DETAILED DESCRIPTION OF EMBODIMENTS

A system will now be described which enables a compressed DVD multimedia data file derived from a DVD format recorded optical recording medium (hereinafter referred to as a "recorded DVD disc") or other medium suitable for storing DVD format multimedia data files such as Digital Linear Tape, to be produced for downloading by an authorised user of the system, which allows an authorised user to produce from a downloaded compressed DVD multimedia data file a DVD multimedia data file which has the navigation capabilities of the original DVD multimedia data file so that the user can access all the features of the original DVD multimedia data file (for example different language versions of the same film, a director's or extended version of the film, featurettes relating to the production of the film, scene selection and so on), and which allows an authorised user to record the thus-produced DVD multimedia data file on a standard format DVD disc so that the recorded DVD disc can be played by a standard DVD player but which prevents or inhibits unauthorised direct digital copying ("ripping") of the thus-produced DVD multimedia data file.

The system comprises a DVD multimedia data supplying apparatus 1 (FIG. 1) that communicates with reproduction apparatus 100 (FIG. 8) via a network N (FIG. 10) such as the Internet. The reproduction apparatus 100 will generally be located in the homes of users but could also be provided in commercial outlets such as shops and Internet cafes.

Figure 1:
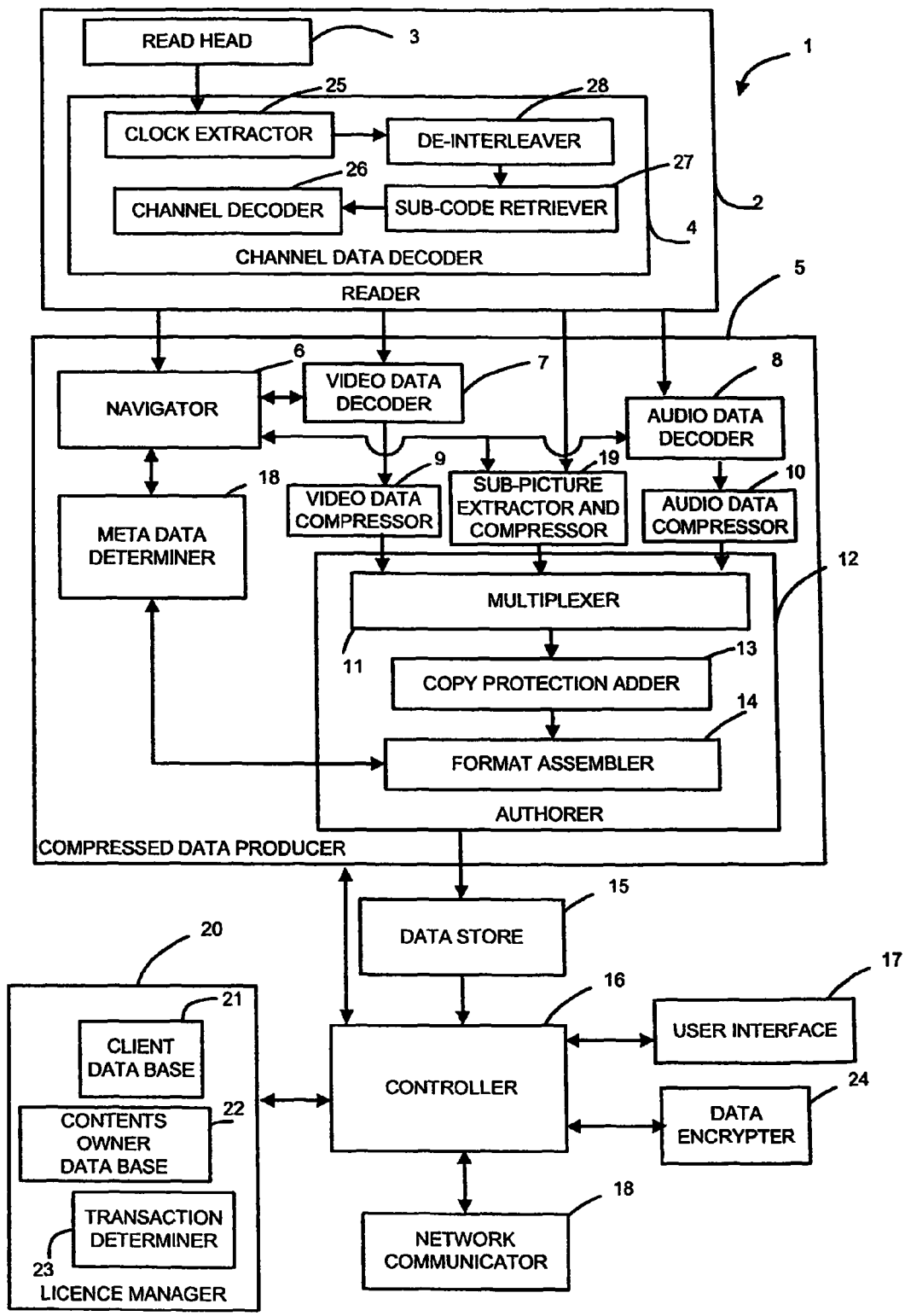
FIG. 1 shows a functional block diagram of DVD multimedia data supplying apparatus embodying the invention.

Referring now to FIG. 1, the DVD multimedia data supplying apparatus 1 has a DVD reader 2 comprising an optical medium read head 3 for reading sectors of data from a recorded DVD disc and a channel data decoder 4 for decoding channel data read by the read head 3. As is conventional, the channel data decoder 2 comprises a clock extractor 25 for extracting a clock signal, a de-interleaver or de-shuffler 28 for de-shuffling the sectors, a sub-code retriever 27 for retrieving sub-code and a channel decoder 26 for decoding the channel data.

The reader may alternatively or additionally comprise a reader suitable for reading other media that may store a DVD multimedia data file such as Digital Linear Tape.

The DVD reader 2 is coupled to a compressed data producer 5 having a DVD navigator 6 which controls reading of a recorded DVD disc by the DVD reader 2 and parses the output of the DVD reader 2 to determine for each sector the type of data contained in that sector. The DVD navigator 6 is coupled to a video data decoder 7, an audio data decoder 8, a meta data determiner 18 and a sub-picture extractor and compressor 19 which, as will be explained below, operate under the control of the DVD navigator 6 to extract and process DVD format video data, audio data, sub-picture data and meta data (control and navigation commands and the like), respectively.

The video data decoder 7 is coupled to a video data compressor 9 while the audio data decoder 8 is coupled to an audio data compressor 10. The video data compressor 9, audio data compressor 10, meta data determiner 18 and sub-picture extractor and compressor 19 supply their respective data to a DVD authorer which has a multiplexer 11 for multiplexing the video, audio and sub-picture data, a copy protection processor 13 for adding copy protection to the data so as to prevent "ripping" and a DVD format assembler 14 for assembling the copy-protected multiplexed video, audio and sub-picture data with the meta data determined by the meta data determiner 9 in accordance with a proprietary DVD format so as to produce a DVD multimedia data file which has a similar format to a standard DVD multimedia data file but in which the video, audio and sub-picture data are compressed much more efficiently, so that the total size of data is considerably smaller.

The DVD authorer 12 is coupled to a data store 15 configured to store many (for example hundreds) of compressed DVD multimedia data files.

The DVD multimedia data supplying apparatus 1 has a controller 16 for controlling the reader 2 and compressed data producer 5 in accordance with the instructions input via a user interface 17. The controller 16 is also coupled to a network communicator 18 to enable communication with reproduction apparatus 100 over a network such as the internet.

In this embodiment, the DVD multimedia data supplying apparatus 1 also has a license manager 20 for ensuring that users of the system make appropriate payments for the DVD multimedia data files that they are downloading and that the DVD contents data owners are appropriately recompensed. In order to achieve this, the license manager 20 may include a client database 21 for storing details relating to clients or users of the system, a contents owner database 22 for storing data related to the contents data owners and a transaction determiner 23 for ensuring, each time a user requests download of a particular DVD title, that the appropriate costs are charged to that client and, if registration is required, that that particular user is registered in the client database 21. In addition, the transactions determiner 23 is configured to determine the royalties and any other payments payable to the corresponding contents data provider for each transaction and to store this information in the contents owner database 22. The DVD multimedia data supplying apparatus 1 also has a data encrypter 24 for encrypting data prior to supply to the network N so that only a user who has been provided with the decryption key can access the data being communicated over the network.

Figure 2:
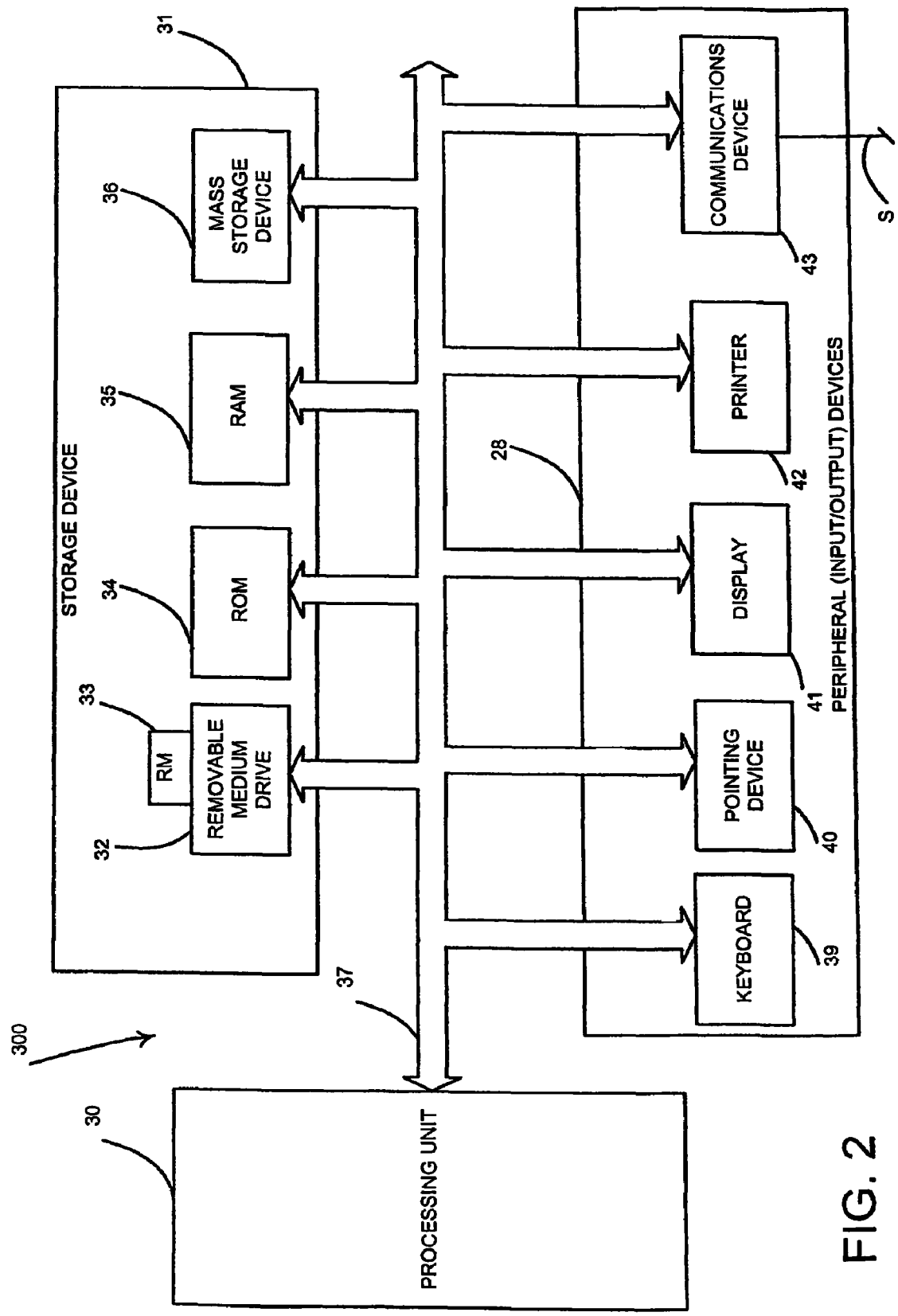
FIG. 2 shows a functional block diagram of computing apparatus that may be programmed to provide the DVD multimedia data file supplying apparatus shown in FIG. 1.

FIG. 2 shows a functional block diagram of computing apparatus 300 that may be programmed by program instructions to provide the supplying apparatus 1 shown in FIG. 1.

The computing apparatus 300 comprises a processing unit 30 coupled by one or more busses 37 to storage devices which comprise a removable medium drive 32 for receiving a removable medium 33 (in this case a DVD drive for receiving a DVD disc and/or a DLT tape drive for receiving DVD format file sets on recordable tape), a read only memory (ROM) 34, a random access memory (RAM) 35 and a mass storage device 36. The mass storage device 36 of the supplying apparatus 1 is of a type and size capable of storing compressed DVD multimedia data files for many different DVDs. Typically, the mass data storage device 36 may be one or more large RAID disc arrays, connected to the computing apparatus directly or via a network connection.

The bus 37 also couples the processing unit to a number of peripheral devices forming the user interface 28, in this case a keyboard 39, a pointing device 40 and a display 41. The peripheral devices also include a communications device 43 providing the network communicator 18 and optionally a printer 42. The communications device 43 may be, for example, a modem, network card or the like for enabling the computing apparatus 300 to communicate over the network N which may, as mentioned above, be the Internet but could alternatively or additionally be an intranet, a local area network, wide area network or any other suitable form of network. To further increase system capacity and reliability, several such computing apparati 300 may be networked together to form a large server farm capable of handling many simultaneous transactions.

It will, of course, be appreciated that the storage devices and input/output devices may not comprise all of those shown in FIG. 2 and/or could comprise additional devices. For example, one or more further removable medium drives, such as a floppy disc drive, may be provided and other input/output devices such as a microphone and a loudspeaker may be provided. Typically, the computing apparatus 300 that is programmed to provide the supplying apparatus 1 will be a server type of computing apparatus.

The computing apparatus 300 may be programmed to provide the DVD multimedia data supplying apparatus by program instructions supplied by any one or more of the following routes:
1. pre-stored in the ROM 34 and/or the mass storage device 36;
2. input by a user using an input device such as the keyboard 39 and/or the pointing device 40.
3. downloaded from a removable medium 33 received by the removable medium drive 32; and
4. supplied as a signal S via the communications device 43.

In order to assist understanding of the system, before the operation of the DVD multimedia data supplying apparatus 1 shown in FIG. 1 is described in detail, the format of a DVD multimedia data file or DVD zone will first be discussed with the aid of FIGS. 3 and 4.

Figure 3:
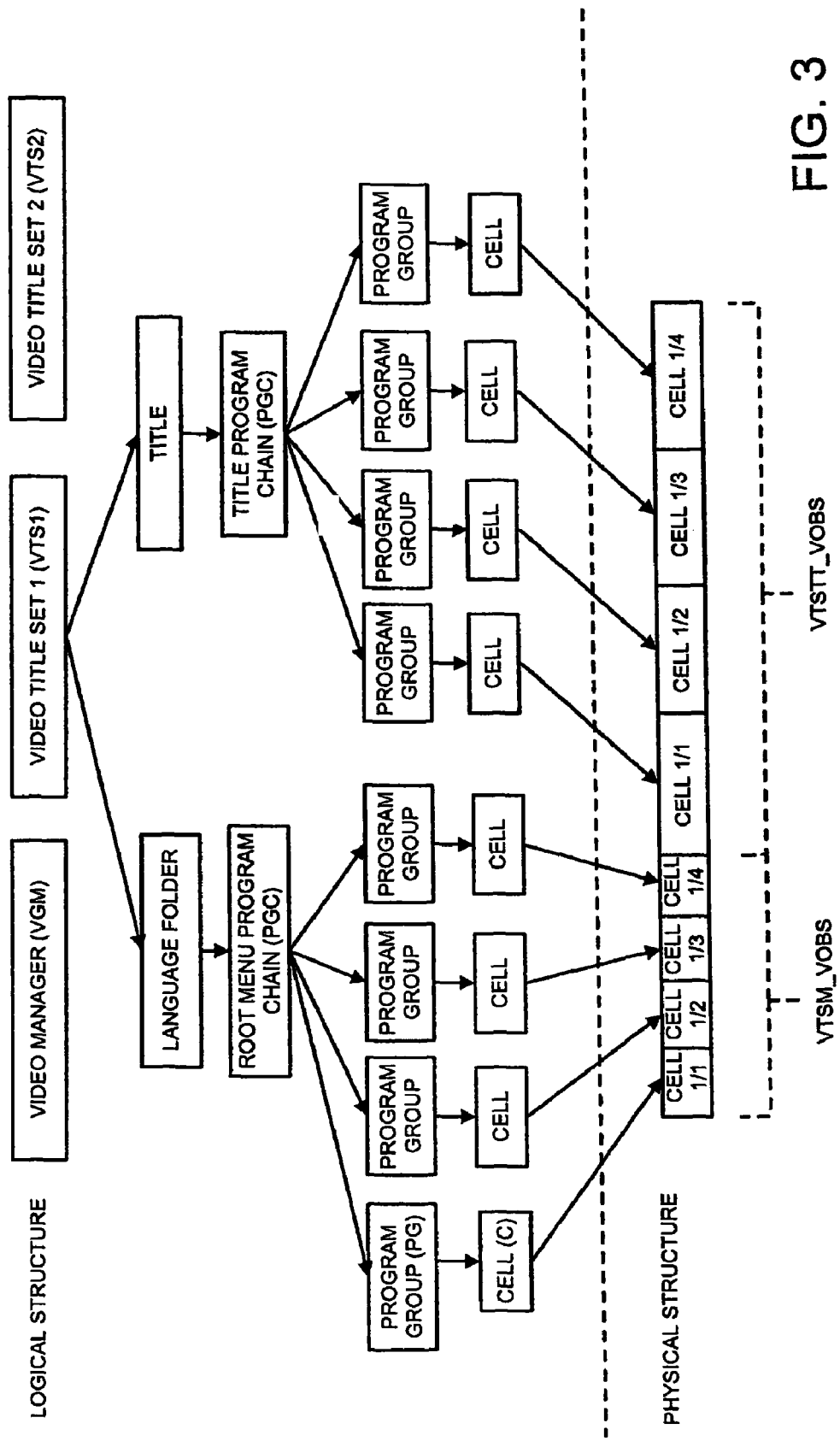
FIG. 3 shows a diagram for explaining the relationship between the logical and physical structures of a DVD multimedia data file or DVD video zone.

FIG. 3 shows a diagram illustrating the logical structure of a DVD zone and its relationship to the physical structure of the DVD multimedia data file. As shown, in accordance with the DVD format, the logical structure consists of a video manager (VMG) which provides control information for the entire DVD video zone and one or more video title sets (VTS), two of which are shown in FIG. 3.

Each video title set has a language folder and a title folder. The language folder is associated with a root menu program chain (PGC) while the title is associated with a title program chain. Each program chain is in turn associated with one or more program groups (PG) and each program group is in turn associated with a cell or a sequence of cells. Each cell consists of one or more video object units (VOBUs).

The logical cells map to corresponding cells of the physical structure with the cells within the menu or title VOBS set of the Video Title Set.

Figure 4:
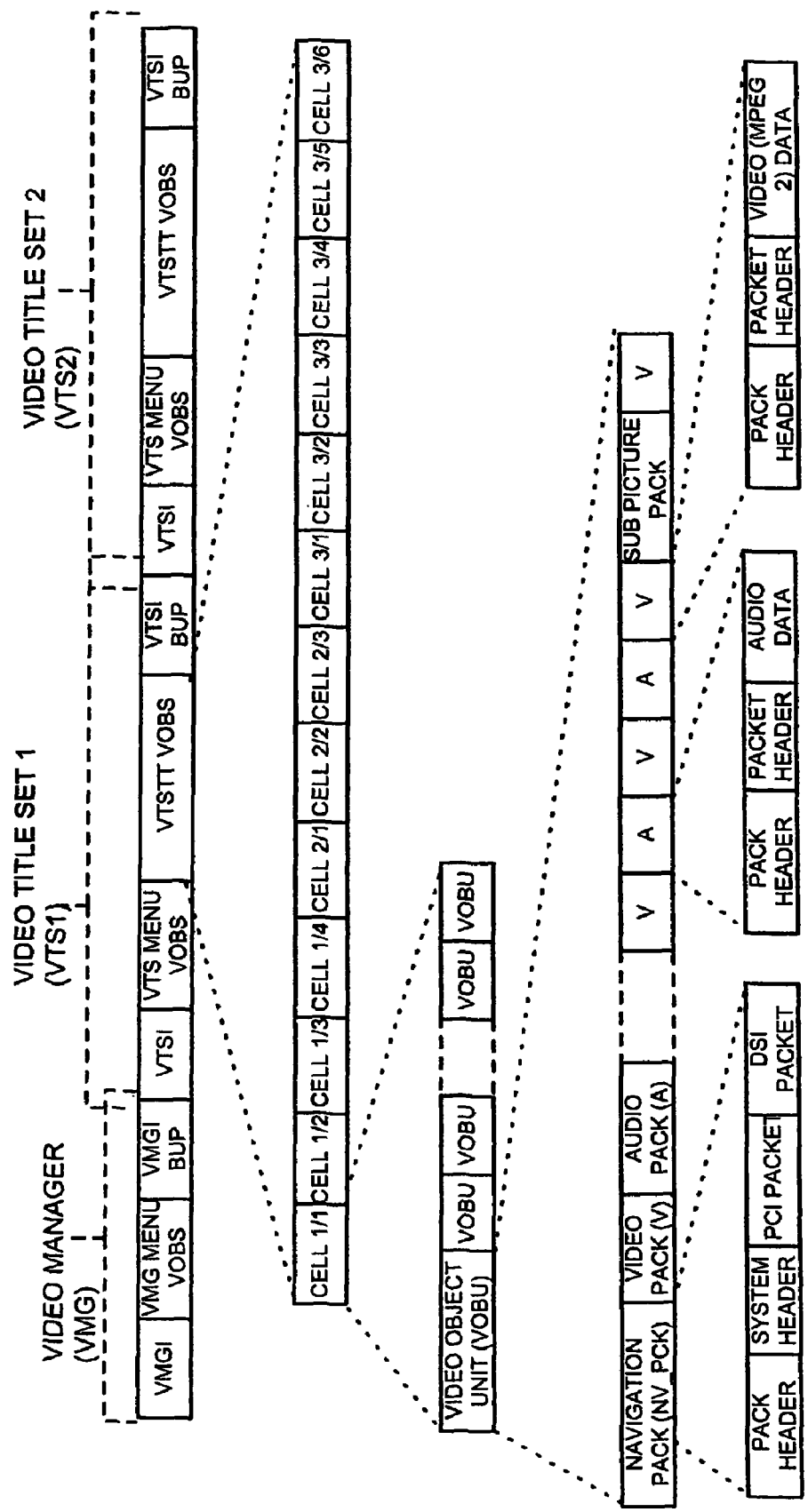
FIG. 4 shows a diagram for explaining in greater detail the physical structure of a DVD multimedia data file or zone.

FIG. 4 shows the physical structure in greater detail. Thus the video manager (VMG) consists of video manager information (VMGI) which provides control information for the entire zone in a single file identified as VIDEO_TS.IFO, a video manager menu video object set (VMG MENU VOBS) provided as a single file identified as VIDEO_TS.VOB and a back up file of the video manager information (VMGI BUP) in a single file VIDEO_TS.BUP.

Each video title set (VTS) consists of video title set information (VTSI) comprising control information for the video title set in a single file VTS_##_0.IFO (where m represents a two digit number between 01 and 99 representing the video title set number), a video object set for the video title set menu (VTS MENU VOBS) which contains the content for all types of menu within the video title set in a single file VTS_##_0.VOB followed by the video title object set (VTSTT VOBS) for the video title set in one or more files identified as VTS_##_@.VOB (where @ is single digit number between 1 and 9) and a back up of the video title set information (VTSI BUP) in a single file identified as VTS_##_0.BUP.

Each video object set (VOBS) consists of a sequence of cells. For clarity in the diagram, FIG. 4 shows the cell set only for the video title set 1 (VTSI). Each cell consists of one or more video object units (VOBUs) which each represent approximately 0.4 to one second of playback time (that is a number of consecutive frames).

As shown in FIG. 4, each video object unit consists of a navigation pack (NV_PCK) followed by an integer number of groups of pictures (GOP) represented as interleaved video (V), audio (A) and sub-picture (S) packs. On a DVD video disc, each pack occupies one sector of user data on the disc (2048 bytes). Each video pack consists of a pack header identifying the pack followed by a packet header identifying the packets within the pack and then the video data in accordance with the DVD video format, that is MPEG2 format. Similarly, each audio pack consists of a packet header identifying the pack followed by a packet header identifying the packets within the pack and the audio data which may be in any format appropriate for DVD, for example MPEG, DTS, DD, LPCM, AC3. The navigation pack (NV_PCK) consists of a pack header identifying the pack, followed by a system header and two packets. The first of the two packets comprises presentation control information (PCI) and the second packet comprises data search information (DSI). DVD players contain a track buffer to enable variable rate and seamless playback. There is therefore a time delay reading by the read head and decoding and playing of the audio and video data. Therefore real time control information is distributed between and stored within the PCI and DSI packets and the player checks and utilises this information before and after the corresponding cell passes through the track buffer. Navigation packs are thus used by the navigation engine of the DVD player to ensure playback, trick play modes and search operations are executed successfully and in a timely manner.

Figure 5:
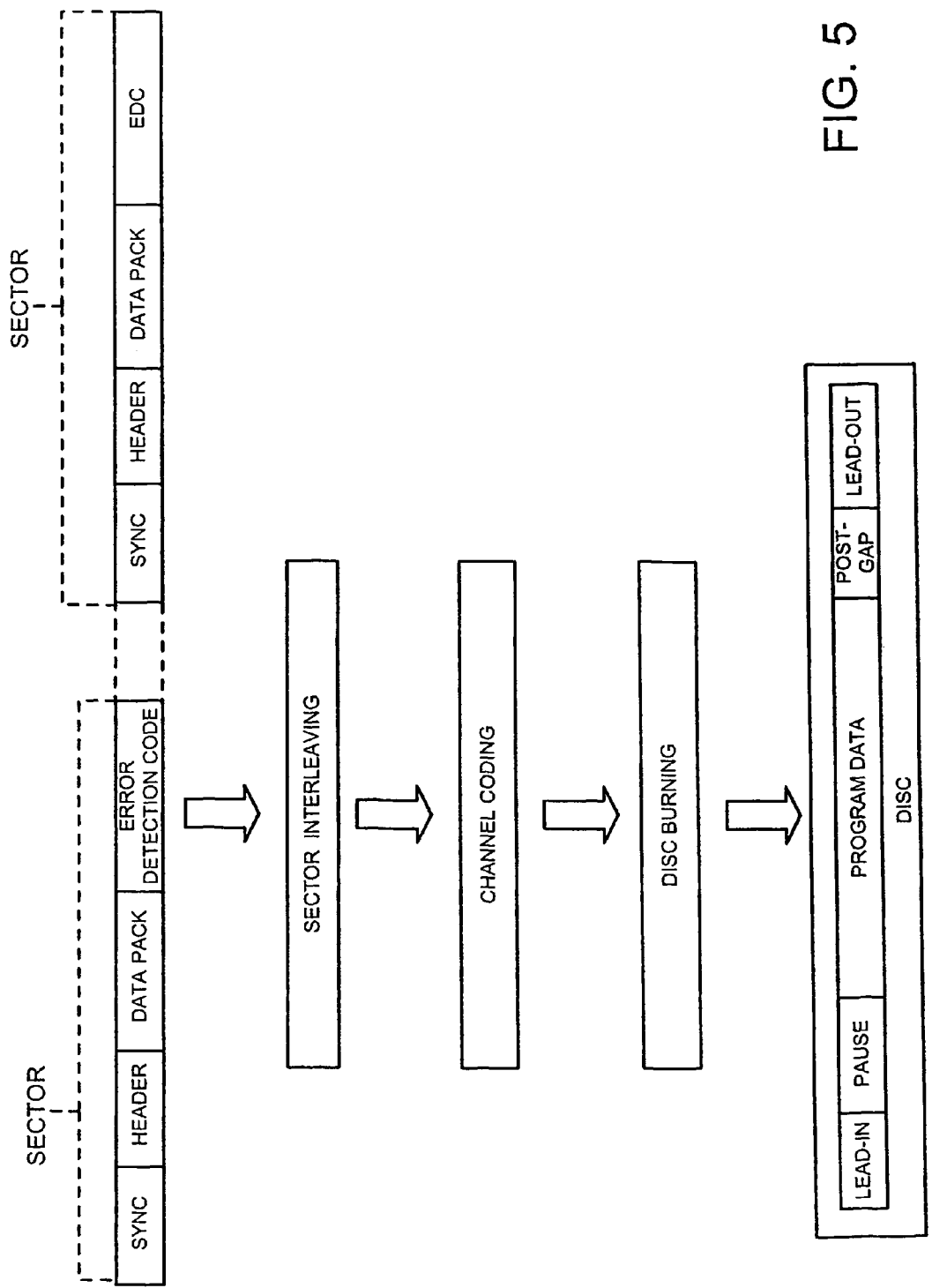
FIG. 5 shows a diagram for explaining recording of a DVD multimedia data file onto an optical recording medium.

FIG. 5 illustrates the relationship between the DVD multimedia data file represented by FIG. 4 and the actual recording on the DVD disc. The data to be recorded on the disc is organised in sectors where a sector will be the smallest addressable unit on the DVD disc. Each sector consists of a SYNC block, a header, a data pack and error detection code. In order to ensure that channel coding rules are met and to minimise the effect of defects on the disc, the data of these sectors have error correction parity codes added and are interleaved in blocks of 16 sectors (an ECC block) before channel coding in accordance with the EFM+ (8 to 16 modulation) channel coding scheme of the DVD format and the channel coded data is burnt onto a blank DVD disc by controlling the laser of a DVD writer in conventional manner to produce pits and lands representing the channel coded data. When recording of the program data has been completed, then the DVD writer prepares and records on the disc a table of contents (TOC) and file system (in accordance with ISO9660/UDF (Universal Disc Format)) so that DVD reader can subsequently locate and therefore access each sector of the disc. As shown in FIG. 5, the final data recorded on the DVD disc consists of a lead-in section containing the table of contents, followed by a pause, then the program data, then a post gap and a lead-out section.

It will, of course, be appreciated that the above is a very simple overview of the DVD format and recording process. For a more detailed description of the DVD format and recording process, reference should be made to the publicly available DVD standards.

As can be seen from the abovementioned description with reference to FIGS. 3 to 5, the DVD multimedia data file recorded on the optical recording medium has a well-defined structure with each recorded sector consisting of a SYNC block followed by a header identifying the subsequent data and with each video object unit (VOBU) consisting of a structured set of data headed by a navigation pack. Moreover, the various sets of data have file names of a pre-set type in accordance with the DVD standard.

Figure 6:
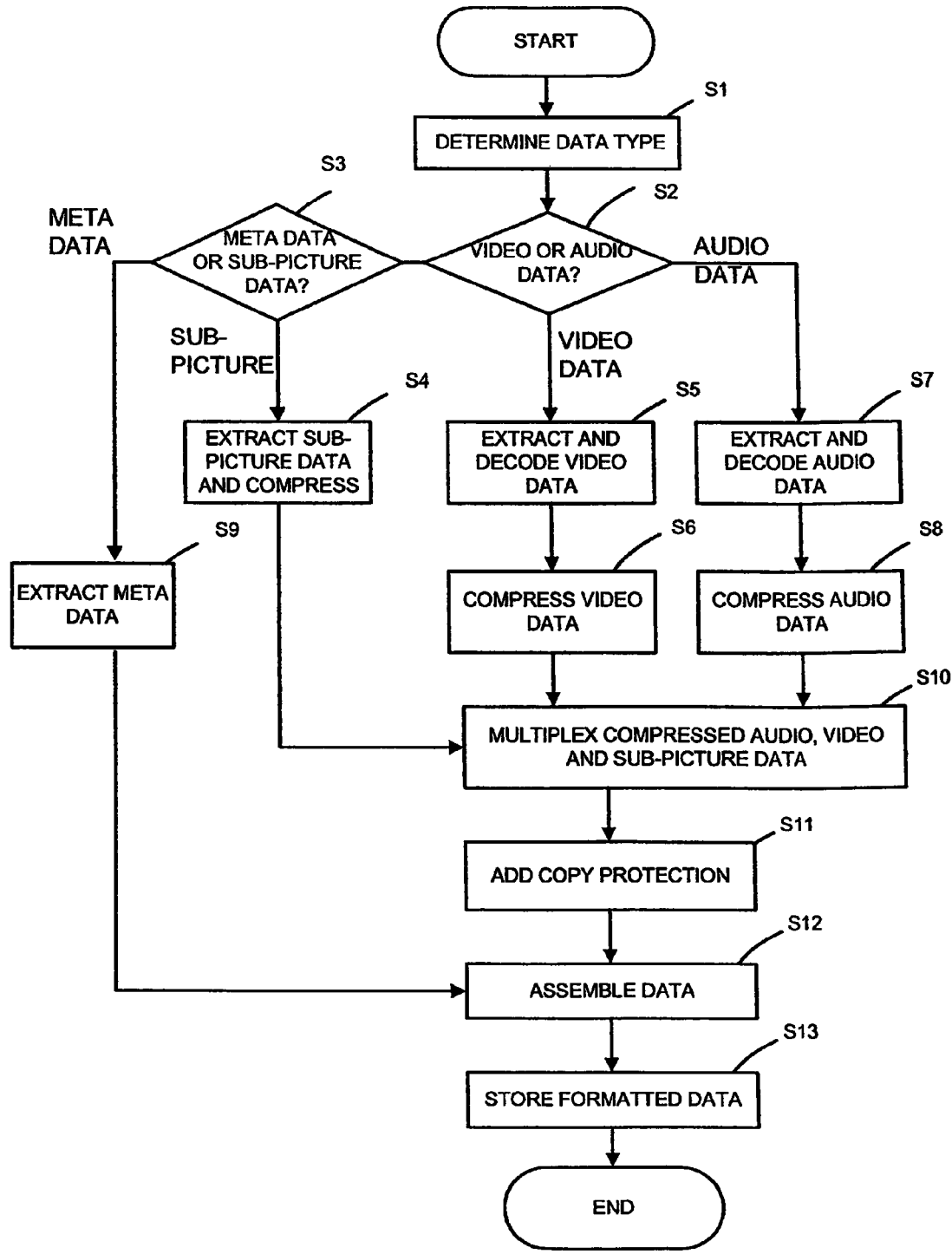
FIG. 6 shows a flowchart for illustrating operations of the DVD multimedia data supplying apparatus shown in FIG. 1 to produce a compressed DVD multimedia data file suitable for downloading.

FIG. 6 shows a flowchart illustrating operation of the supplying apparatus shown in FIG. 1 to convert an original DVD multimedia data file to a compressed multimedia DVD multimedia data file and to store the same.

As set out above, the DVD navigator 6 controls the DVD reader to read the DVD disc sector by sector. Within the VMGI and each VTSI there exist several tables of information which can be parsed by the DVD navigator. Typically the DVD navigator will first read the tables in the VMGI to determine the number and location of all the VTS's on the disc, then the DVD navigator will read the tables in the VTSI for each VTS to determine the location of the cells contained with the VOBS, and their logical relationships to one another, the menus, any commands to be performed, the programs (PG) and the program chains (PGC). At this point the DVD navigator has built up an internal picture of the logical and physical structure of the content located on the DVD disc.

This enables the DVD navigator 6 to determine whether the data pack of each sector within the video zone represents meta data (for example comprises a navigation pack) or comprises video, sub-picture or audio data, for example.

If, at S2, the incoming data type is determined to be video data then at S5, the DVD navigator 6 controls the video data decoder or CODEC 7 to cause the video data decoder to extract and decode the MPEG2 encoded received video data, and at S6 the video data compressor or CODEC 9 compresses the decoder video data to a more efficient format such as MPEG4 or DIVX. If, however, the incoming data is determined at S2 to be audio data then at S7, the DVD navigator 6 controls the audio data decoder or CODEC 8 to extract and decode the incoming audio data and at S8 the audio data compressor or CODEC 10 compresses the decoded audio data to an appropriate compressed format such as Ogg Vorbis (a non-proprietary open source audio compression format that is similar to MP3) or WMA (Windows Media Audio). If however, the DVD navigator 6 determines at S3 that the incoming data is sub-picture data then at S4 the DVD navigator 6 causes the sub-picture extractor and compressor 19 to extract the sub-picture data and compress it. Sub-pictures, being primarily only a few words of text per second, do not occupy much space (typically about 1% of the total bandwidth) in the DVD multi media data file when compared to the audio and video data. Accordingly, any suitable compression method may be used such as, for example, LZW (Lempel-Zif & Welch) data compression or the like. If, however, at S3, the DVD navigator 6 determines that the incoming data is meta data then the DVD navigator 6 extracts the meta data and passes this to the meta data determiner 18. It will, of course, be appreciated that the determination of whether the data is video, audio, meta data or sub-picture data has been separated into different operations in FIG. 6 simply for ease of illustration. In practice, the DVD navigator 6 will decide in one pass whether each sector comprises video data, audio data, meta data or sub-picture data.

The above procedures S1 to S10 are carried out as the data is read sector by sector from the recorded DVD disc. The streams of compressed sub-picture, video and audio data are multiplexed at S10 by the multiplexer 11 and at S11 the copy protection processor 13 adds copy protection. In this example, copy protection is added in the manner described in US2005/0185926 or US2005/0259546, the whole contents of which are hereby incorporated by reference. In brief, the copy detection processor adds at S11 cells of subversive data ("subversive cells") between the cells of actual video, audio and sub-picture data but ensures that there are no legitimate navigable paths to the subversive cells by a compliant player.

Then, at S12, the DVD format assembler 14 reassembles the data into a DVD-like proprietary format using the extracted meta data and prepares additional data representing the mapping between the original sectors or packs of data and the modified compressed packs of data. The compressed data packs should of course be smaller than the uncompressed data packs. To facilitate subsequent reconstitution of the original DVD multimedia data file, the DVD format data assembler 14 may also incorporate flags or other markers in the compressed data to indicate the location and original size of the uncompressed data packs within the compressed data packs. The DVD format data assembler 14 will also include in the meta data for the compressed DVD multimedia data file not only the meta data from the original DVD multimedia data file but also data showing the relationship between the uncompressed packs of data and the compressed packs of data to facilitate subsequent reconstitution of the original DVD multimedia data file, that is to facilitate reconstruction of all of the tables contained within the VMGI and VTSI's of the reconstituted DVD multimedia data file, once the compressed packs have been re-inflated to standard DVD format.

Figure 7:
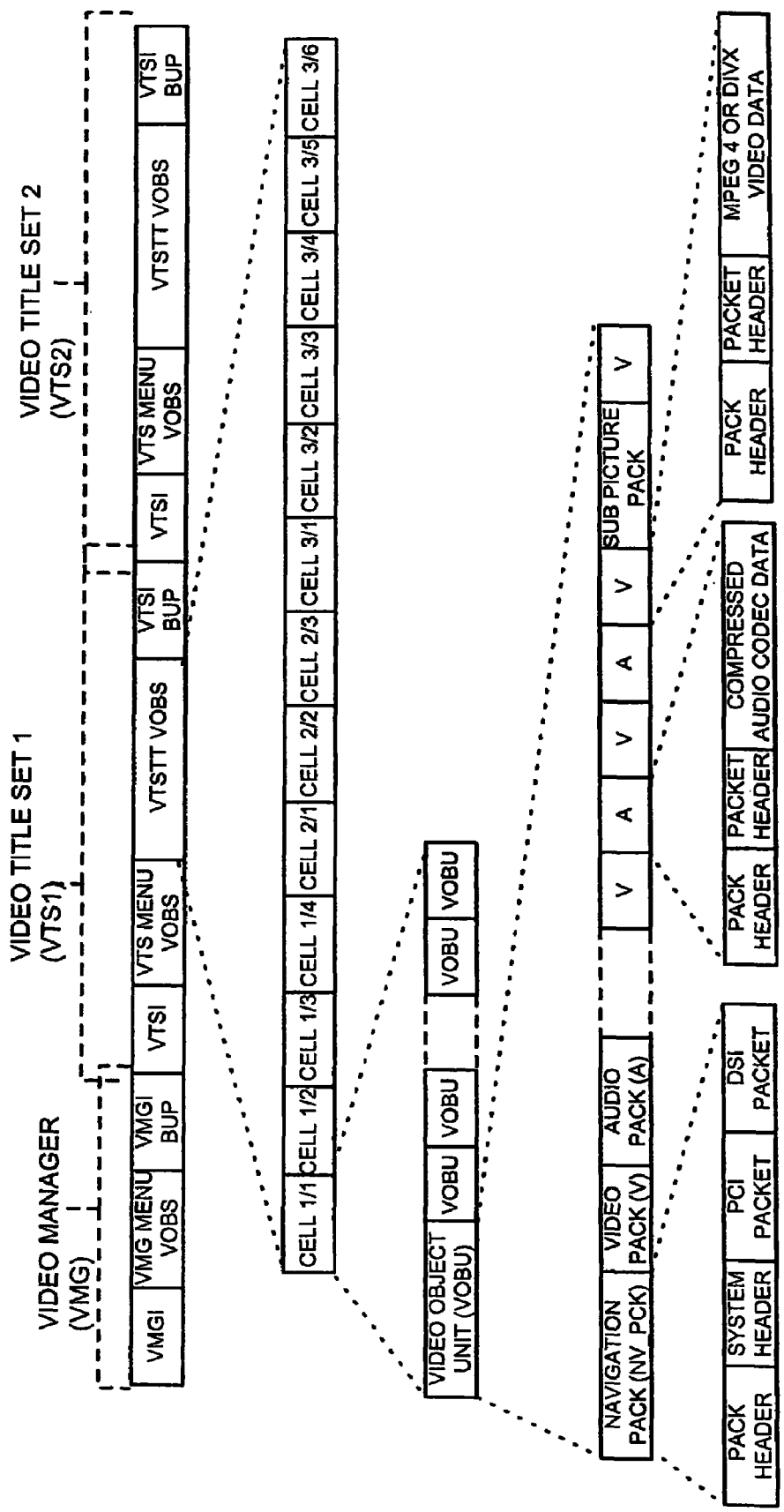
FIG. 7 shows a diagram similar to that shown in FIG. 4 for illustrating the physical structure of a compressed DVD multimedia data file produced by the supplying apparatus shown in FIG. 1.

FIG. 7 shows the physical structure of the compressed DVD multimedia data file assembled by the DVD format data assembler 14. As can be seen by comparing FIGS. 4 and 7, the physical structure of the compressed DVD multimedia data files is similar to that of the original DVD multimedia data file except that the data in the video, audio and sub-picture packs is not the original data but is compressed data with each compressed data pack consisting of more than one of the original data packs. It will be appreciated that the compression ratio is unlikely to be an exact integer number, so there is no direct correlation between the original video packs and the compressed video packs. Meta data provided by the meta data extractor provides the necessary information to reconstitute the original packs into standard DVD format and insert padding data where necessary to recreate VOBUs. The recreated video content need not be identical to the original video content provided that all the meta data and tables within the VMGI and VTSI are self consistent and compliant with the DVD video specifications. In this case the user experience will be equivalent.

Once the compressed DVD multimedia data file has been produced by the DVD authorer 12, then the controller 16 causes the compressed DVD multimedia data file to be stored in the data store 15.

The procedure described above can be repeated for many DVD multimedia data files or titles so that the data store 15 may contain many, for example several hundred, compressed DVD multimedia data files each corresponding to a respective different recorded DVD disc or DVD title.

Figure 8:
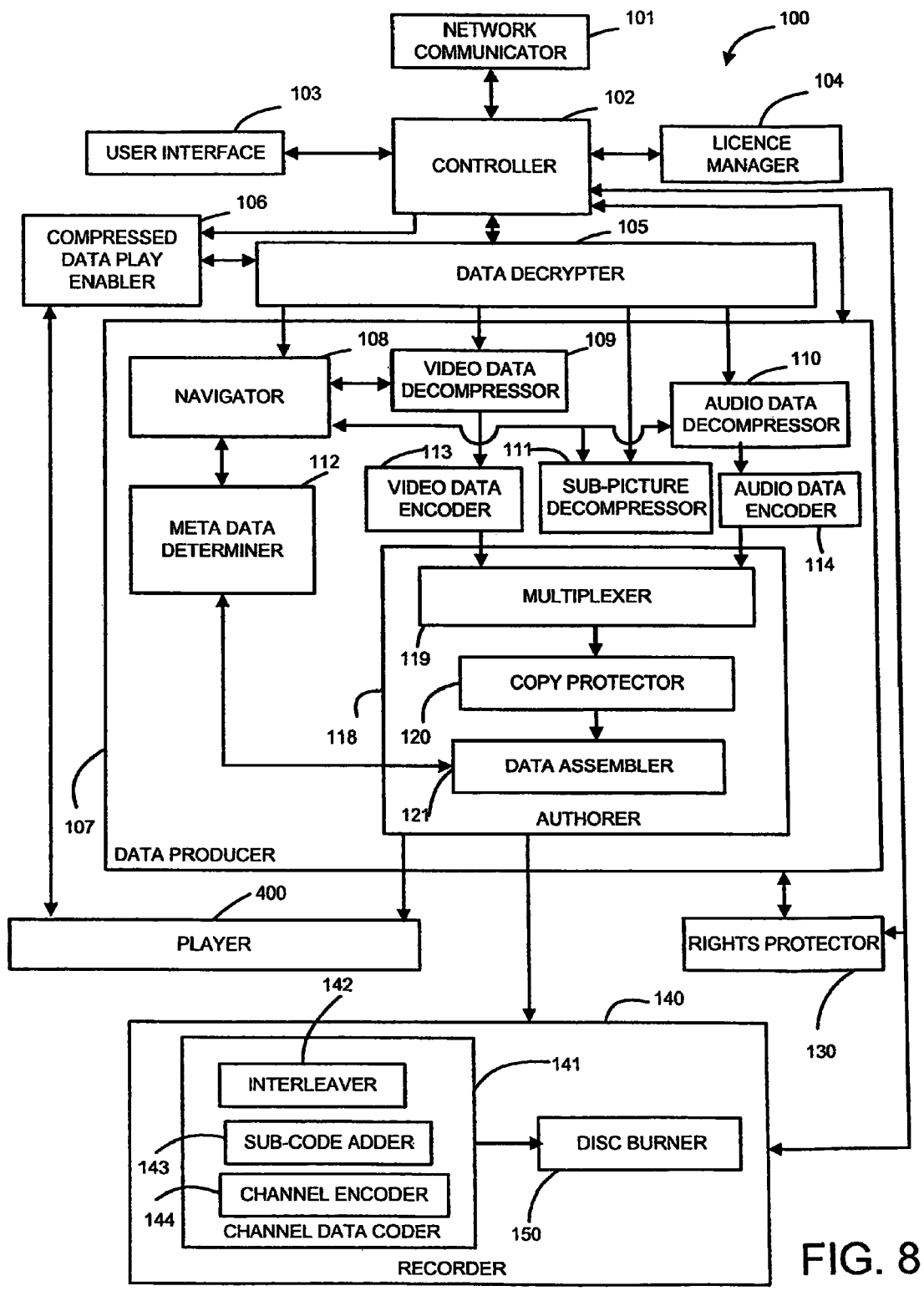
FIG. 8 shows a functional block diagram of DVD multimedia data file reproducing apparatus embodying the invention.

FIG. 8 shows a functional block diagram of an example of reproduction apparatus 100 suitable for enabling a user to access the DVD multimedia data supplying apparatus shown in FIG. 1 via the network N (FIG. 10) and to download, decrypt and play the compressed DVD multimedia data file and also to produce a copy-protected reconstituted multimedia data file that can be "burnt" to a DVD disc that may be played in any standard DVD player.

The reproduction apparatus 100 has a controller 102 for controlling overall operation of the reproduction apparatus. The controller 102 is coupled to a user interface 103 for enabling the user to input instructions to the controller 102. The controller 102 is also coupled to a rights or license manager 104 and a data decrypter 105 coupled to a compressed DVD data player 106 in the form of a plug-in for DVD player software of the reproduction apparatus 100 that enables the DVD player 400 of the reproduction apparatus to play a downloaded compressed DVD multimedia data file.

Figure 10:
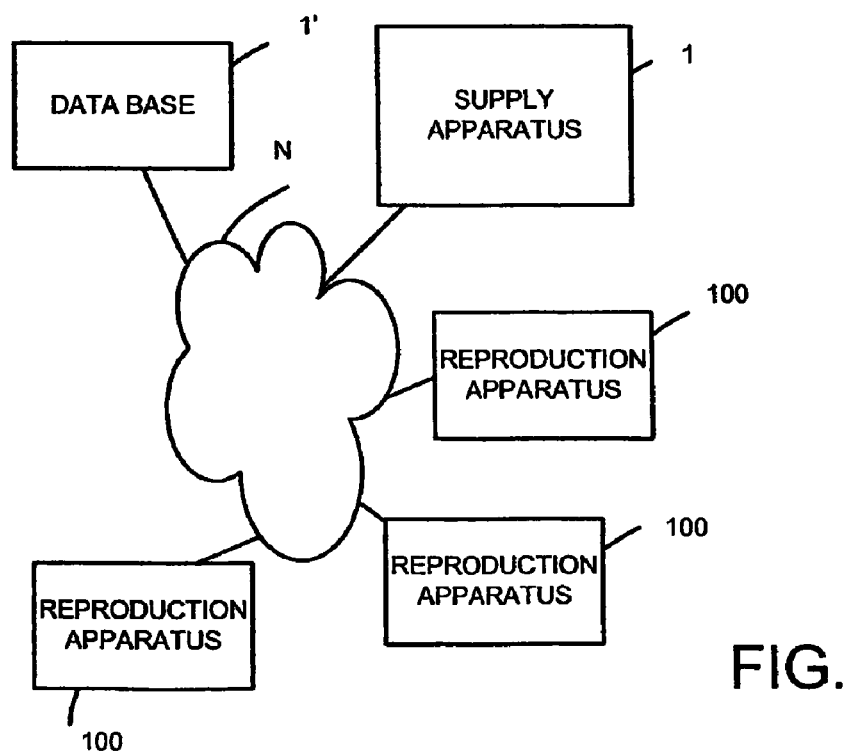
FIG. 10 shows a simple diagram of a system in which a number of the reproduction apparatus shown in FIG. 8 are coupled to the supplying apparatus shown in FIG. 1 via a network.

The controller 102 is also coupled to a network communicator 101 for enabling the reproduction apparatus 100 to communicate with the supplying apparatus 1 via the network N (FIG. 10).

The data decrypter 105 is also coupled to a DVD data producer 107 which has a DVD navigator 108 for navigating a compressed DVD multimedia data file and for parsing the decrypted data to determine the type of each compressed data pack.

The DVD navigator 108 is coupled to a video data decompressor or CODEC 109, an audio data decompressor or CODEC 110, a sub-picture data decompressor 111 and a meta data determiner 112. The video data decompressor 109 and the audio data decompressor 110 are coupled, respectively, to a video data encoder or CODEC 113 for encoding the decompressed video data in MPEG2 format and an audio data encoder or CODEC 114 for re-encoding the decompressed data in an appropriate DVD audio data format such as MPEG, DTS, DD, LPCM or AC3 format.

Each of the video data encoder 113, sub-picture data decompressor 111, audio data encoder 114 and meta data determiner 112 is coupled to a DVD authorer 118 which has a multiplexer 119, a copy protector processor 120 and a DVD data assembler 121. The DVD authorer 118 is operable to receive the encoded video data, encoded audio data and decompressed sub-picture data and the meta data provided by the meta data determiner 112, to multiplex the video, audio and sub-picture data in packs corresponding to the packs of the original DVD multimedia data file and to reassemble the multiplexed data in a copy-protected manner with the determined meta data so as to produce an output DVD multimedia data file having the physical format shown in FIG. 4 so that the DVD multimedia data file is reconstituted in its original format with all of the navigational data intact and copy protection applied. Although the resulting output DVD multimedia data file will not (because the compression and inflation process is not lossless due to the nature of the perceptual coding and decoding involved) be a bit-for-bit identical copy of the original DVD multimedia data file, the navigational structure and user experience are subjectively the same so the output DVD multimedia data file, when played by a DVD player, should look and sound indistinguishable from the original DVD multimedia data file to the user.

The copy protector processor 120 in this example is provided to identify the subversive cells inserted by the copy protection adder 13 of the supplying apparatus 1 and to ensure that there are no navigable paths to any regions of subversive data.

To reduce the possibility of anybody circumventing the copy protection by replacing or modifying the DVD data producer 107, the DVD data producer is associated with a rights protector in the form of a rights management driver component or rights protector 130 which only allows the DVD data producer 107 to operate if the rights management driver 130 identifies the DVD data producer 107 as being authentic and not tampered with.

The DVD data producer 107 is thus able to produce a copy-protected DVD multimedia data file of standard DVD format. The DVD data producer 107 is coupled to the DVD player 400 so that the user can play the DVD title on the reproduction apparatus 100 and have access to all of the navigation features of the original recorded DVD disc.

In the example shown in FIG. 8, the DVD data producer 107 is also coupled to a DVD recorder 140 comprising a channel data coder 141 having an interleaver 142, a sub-code adder 143 and a channel encoder 144 for carrying out the conventional DVD channel encoding operations and a DVD disc burner 150 of conventional form for burning the copy-protected DVD multimedia data file onto an optical recording medium to produce a copy-protected version of the original DVD multimedia data file, complete with all of the original navigational capabilities, that can be played in any standard format DVD player which is capable of playing recorded recordable media, enabling the user to watch the film (movie) or music video or the like using, for example, a DVD player associated with their television set, home cinema or home entertainment system, rather than being limited to watching the content on their personal computer. The fact that the recorded disc is copy-protected means that the recorded DVD disc (or the DVD multimedia file from which it was produced) cannot then be "ripped" to produce further copies. In addition the license manager 104 of the reproduction apparatus ensures that the user can only burn the number of copy-protected discs specified by the license that they have purchased. Usually, the license will allow the user only to burn one generation of copy-protected disc.

Figure 9:
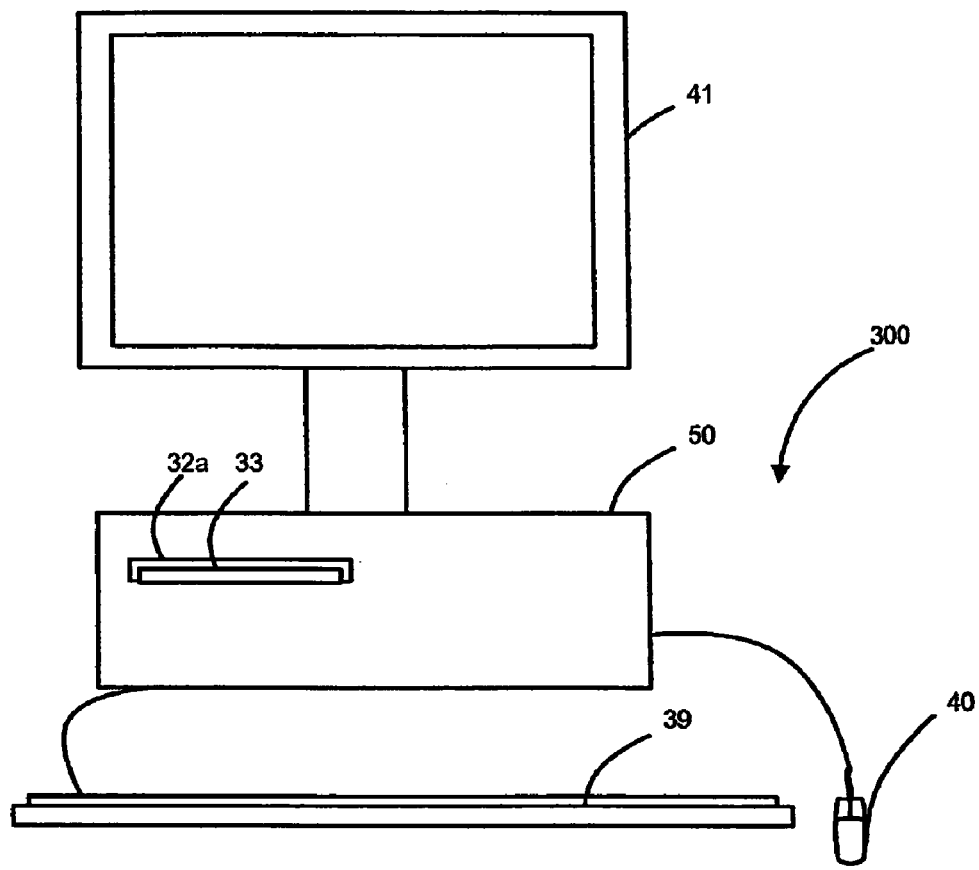
FIG. 9 shows a diagram for illustrating an example of computing apparatus that may be programmed to provide the reproducing apparatus shown in FIG. 8.

The reproduction apparatus 100 shown in FIG. 8 may be implemented by programming computing apparatus such as that shown in FIG. 2. In the case of the reproduction apparatus 100 which is primarily intended to be used within the home or domestic environment, the computing apparatus will generally be a personal computer 300a which, as shown diagrammatically in FIG. 9, has a main processor unit 50 containing the processing unit 30 and storage devices 31 and user interface devices in the form, as shown, of a keyboard 39, mouse 40 and display 41. FIG. 9 shows a DVD 33 produced by the reproduction apparatus being ejected from an insertion slot 32a of the removable medium drive 32.

FIG. 10 shows a diagram of a reproduction system in which a number of reproduction apparatus 100 (as shown three) are coupled to the supplying apparatus 1 via a network N which will generally be the Internet but could also be a local area network, a wide area network, an intranet and so on. As so far described, the supplying apparatus 1 includes all the functionality to read recorded DVD discs or DLT tapes, to produce compressed DVD multimedia data files, to store several hundred such compressed DVD multimedia data files and to control the manner in which such compressed DVD multimedia data files may be supplied to users via the network N. It will, however, be appreciated that not all of this functionality need necessarily be provided by a single apparatus. For example, the data store 15 may be located on another part of the network in a data base 1' as shown in FIG. 10. As another possibility or additionally, the license manager 20 may be physically separated from the remainder of the supply apparatus, for example on another part of the network or directly connected to the remainder of the supply apparatus. Similarly, the compressed data producer 5 may be physically separated from and/or located on another part of the network from the remainder of the supply apparatus. Any configuration is possible provided that all of the functionality shown in FIG. 1 is available via the network N.

The operation of the system when a user of a reproduction apparatus requests the supplying apparatus to supply a compressed DVD multimedia data file will now be described with the aid of FIGS. 11 to 13.

Initially the user of the reproduction apparatus uses their web or other network browser to access a web page or other graphical user interface for the reproduction apparatus 1. This web page or other graphical user interface will, of course, explain to the user how to use the system and prompt the user to select a DVD title to be downloaded and also to select the type of download they require. For example, the user interface may have a search facility that enables the user to search the DVD database for the DVD title(s) that they wish to download.

Figure 11:
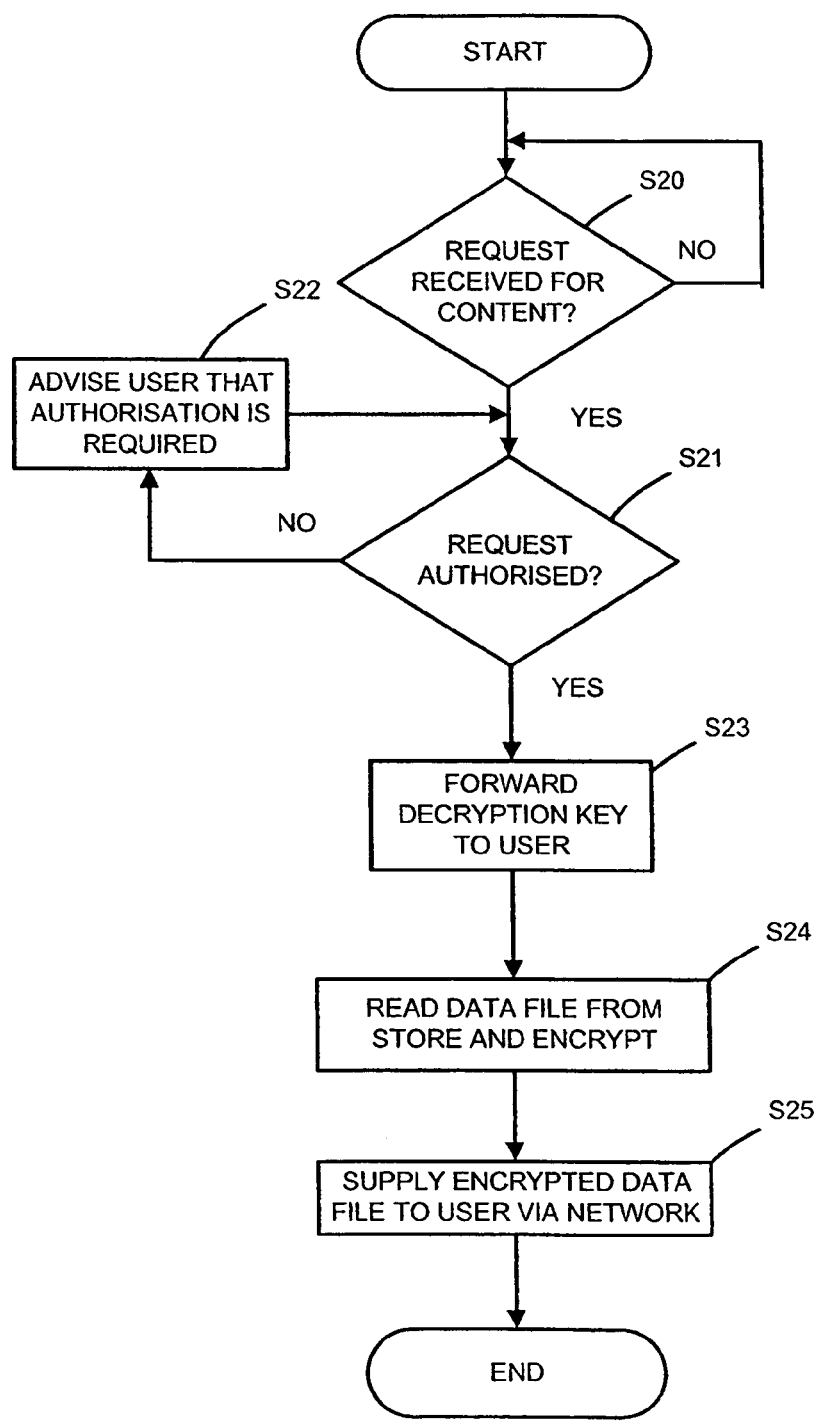
FIG. 11 shows a flowchart illustrating operations carried out by the supplying apparatus shown in FIG. 1 in response to a request to download a DVD multimedia data file received via the network.

Once the user has selected a title at S20 in FIG. 11 then, at S21 the reproduction apparatus 1 determines from the license manager 20 whether that particular user is entitled to download that particular DVD multimedia data file.

Assuming the answer at S21 is no, the user is not authorised, then at S22 the reproduction apparatus 1 causes the graphical user interface to display to the user a message saying something along the lines of "please select the type of download you require" and giving the user the option of selecting download of the DVD compressed data file only or of download of the compressed DVD multimedia data file with the right to produce a copy-protected version of the downloaded file in standard DVD format. The costs for these two alternative types of download may also be displayed to the user.

Once the user has selected the type of download, then, as is conventional for payment over the Internet, the user will be transferred to a secure site to effect payment for the transaction.

When the user has effected payment for the transaction and this payment has been verified in the normal manner, then the license manager 20 advises the controller 16 of the reproduction apparatus at S21 that the request has been authorised and securely supplies the controller 16 with a unique key or code set for enabling encryption and decryption of the selected compressed DVD multimedia data file. Then, at S23, the controller 16 causes the network communicator 18 to forward the decryption key to the user's reproduction apparatus 100 and, once the user's reproduction apparatus 100 has acknowledged receipt, at S24 the controller 16 controls the data encrypter 24 to encrypt the selected compressed DVD multimedia data file in accordance with the unique key or code set provided by the license manager 20. Any suitable conventional form of data encryption may be used, for example a public-private key system.

Once the selected compressed DVD multimedia data file has been encrypted and the user's reproduction apparatus has acknowledged receipt of the decryption key, then at S25, the controller 16 causes the selected encrypted compressed DVD multimedia data file to be supplied, together with license control data determining what the reproduction apparatus can do with the downloaded file, to the user's reproduction apparatus 100 via the network N.

As shown in FIG. 11, the decryption key is forwarded to the user prior to encryption of the selected compressed DVD multimedia data file. It will, however, be appreciated that these operations may be performed in the reverse order or possibly also simultaneously.

Figure 12:
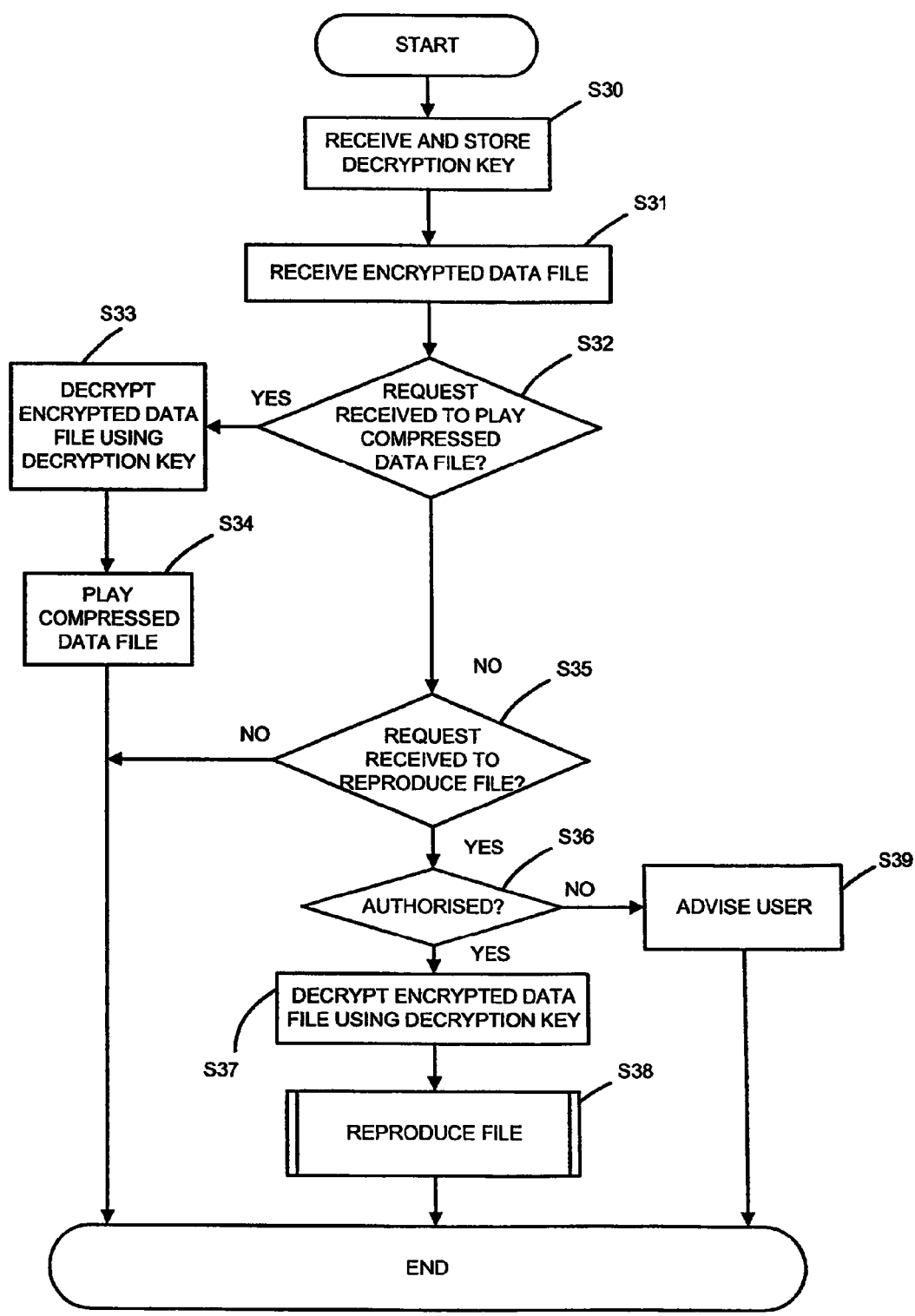
FIG. 12 shows a flowchart illustrating operations carried out by the reproduction apparatus shown in FIG. 8.

FIG. 12 shows the operations carried out by the user's reproduction apparatus 100 following a user's request for download of a compressed DVD multimedia data file.

Thus, when at S30 the user's reproduction apparatus 100 receives the decryption key, the controller 102 causes this decryption key to be stored by the data decrypter 105.

When, at S31, the user's reproduction apparatus 100 subsequently receives the encrypted DVD multimedia data file and accompanying license control data, then the controller 102 determines at S32 whether a request has been received to play the compressed DVD multimedia data file. If so then, at S33 and S34, the controller 102 activates the compressed DVD data player enabler 106 or plug-in software that enables the DVD player 400 of the reproduction apparatus to play the decrypted compressed multimedia DVD multimedia data file and causes the data decrypter 105 at S33 to decrypt the encrypted DVD multimedia data file using the stored decryption key and the DVD player 400 to play the compressed data file (S34).

The decryption mechanism includes anti-tampering code to ensure that the user is not attempting to subvert the digital rights associated with the secure data.

As so far described, it is assumed that any form of authorised payment for the download of a compressed DVD multimedia data file will provide a license to play the compressed multimedia data file and that therefore it is not necessary to check for authorisation to play the compressed DVD multimedia data file provided a suitable license exists and has not expired.

If, at S35, the controller 102 receives via the user interface 103 a request to reproduce or reconstitute a DVD multimedia data file with the navigational capabilities of the original DVD title, then at S36, the controller 102 checks with the license manager 104 whether the user has purchased a license that enables them to produce a copy-protected DVD multimedia data file from the compressed DVD multimedia data file. If the answer is no, then the controller 102 causes at S39 the user to be advised by the user interface that they are not currently authorised to produce a copy-protected DVD multimedia data file and may provide the user with information as to how they can purchase a license to produce such a file. As described above, the checks with respect to the license purchased by the user are carried out between the controller 102 and the license manager 104 of the reproduction apparatus 100. To provide added security to ensure that the end user cannot interfere with the license arrangements, the check regarding the obtained license may be carried out by communication between the controller 102 of the user's reproduction apparatus and the controller 16 of the supply apparatus 1 shown in FIG. 1.

Each time a user purchases a license to download a DVD title and/or to produce a copy-protected DVD multimedia data file in conventional DVD data format, then the controller 16 causes the license manager 20 of the supplied apparatus to store the appropriate information in the contents owner database 22 so that the appropriate license fees can be passed onto the owner of the contents data.

Assuming that the user has purchased a license that enables them to produce a copy-protected DVD multimedia data file with the navigational capabilities of the original DVD title from the compressed DVD multimedia data file, then at S37 and S38 the controller 102 requests the right protector 130 to authenticate the DVD data producer 107 to ensure that, the user has not tried to circumvent the copy protection by modifying the DVD data producer or by using alternative software and, assuming that the rights protector 130 authenticates the DVD data producer 107, causes the data decrypter 105 to decrypt the encrypted DVD multimedia data file using the stored decryption key and the DVD data producer to produce the copy-protected DVD multimedia data file with the navigational capabilities of the original DVD title.

Figure 13:
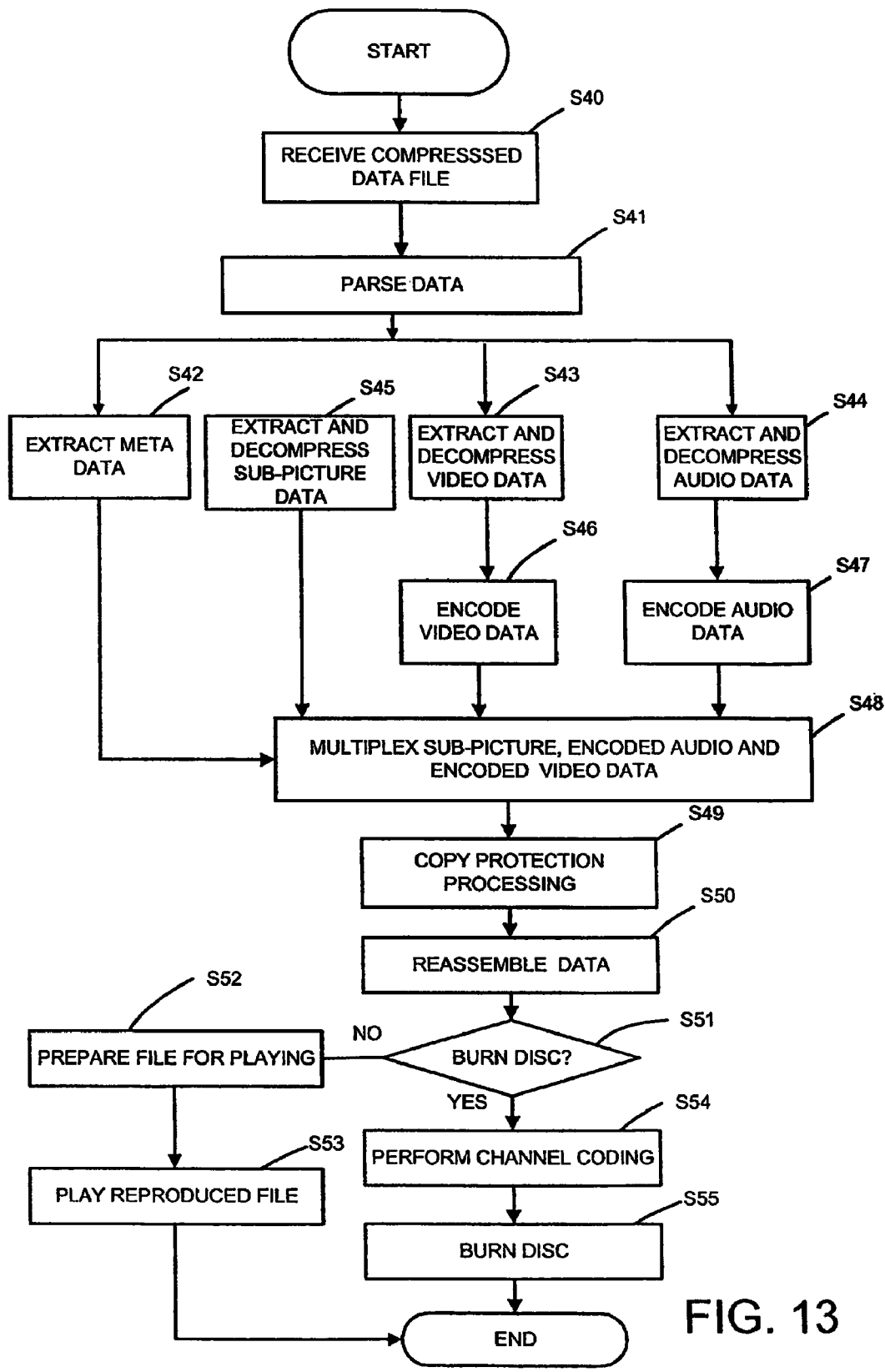
FIG. 13 shows a flowchart for illustrating in greater detail operations carried out by the reproduction apparatus shown in FIG. 8 to produce an optical recording medium carrying a copy-protected downloaded multimedia data file.

FIG. 13 shows operations carried out by the DVD data producer 107 to produce the copy-protected DVD multimedia data file once the rights protector 130 has authenticated the DVD data producer.

Thus, at S40 the DVD data producer 107 receives the decrypted compressed DVD multimedia data file from the data decrypter 105 and the DVD navigator 108 parses the compressed DVD multimedia data file at S41 to identify the meta-data, sub-picture data, video data and audio data of the compressed DVD multimedia data file in accordance with their respective identifiers. The DVD navigator 108 controls the video data decompressor or CODEC 109, audio data decompressor or CODEC 110, and sub-picture decompressor 111 to decompress the corresponding data at S45, S43, and S44. The DVD navigator 108 also passes the extracted meta data at S42 to the meta data determiner 112. For convenience, FIG. 12 shows operations S42 to S45 as being carried out in parallel. It will however, be appreciated that these operations are carried out as and when the DVD navigator 108 identifies that a data pack represents the corresponding type of data.

The extracted and decompressed video and audio data streams provided by the video data decompressor 109 and audio data decompressor 110 are supplied to the video data encoder 113 and audio data encoder 114, respectively, which encode their respective data at S46 and S47. The video data encoder 113 is an MPEG2 CODEC which encodes the decompressed video data in accordance with the MPEG2 DVD standard while the audio data encoder 114 is an appropriate DVD audio CODEC, for example an MPEG, DTS, DD, LPCM or AC3 audio CODEC.

The encoded video and audio data streams are supplied together with the decompressed sub-picture data to the DVD authorer 118 which produces a copy-protected DVD multimedia data file by re-multiplexing or interleaving the audio, video and sub-picture data and reincorporating the meta data determined by the meta data determiner uses the information in the compressed DVD multimedia data file. The authoring engine uses the information from the meta data, and the video and audio CODECS, to correctly re-assemble the tables of information in the VMGI and VTSI to ensure compliance with the DVD specification.

As can be seen from FIGS. 8 and 13, the DVD authorer 118 re-multiplexes or interleaves the sub-picture, and encoded audio and video data at S48 and then carries out copy protection processing at S49. In this example, the copy protection processing used is that described in US2002/0185926 as mentioned above. This means that the downloaded compressed DVD multimedia data file contains subversive data which would, in the absence of the copy protector 120, prevent or significantly slow the copy process or would invoke error correction or data recovery techniques which would render any "ripped" copy disc unplayable. The copy protector 120 acts at S49 to insert the subversive data and ensure that the meta data of the reassembled DVD multimedia data file contains no navigable paths to these subversive data. The DVD data producer then assembles the copy-protected DVD format multimedia data file at S50.

The controller 102 may then prompt the user via the user interface 103 to indicate whether they wish to "burn" the copy-protected DVD format multimedia data file onto a blank DVD format optical recording medium or whether they wish simply to play the copy-protected DVD format multimedia data file on the DVD player 400 of the reproduction apparatus 100. If the user elects, using the user interface 103, simply to play the copy-protected DVD format multimedia data file on the DVD player 400 of the reproduction apparatus 100, then the controller 102 at S52 takes any action necessary to render the copy-protected multimedia data file ready for playing and at S53 causes the DVD player 400 to play the copy-protected DVD format multimedia data file, enabling the user to access all of the navigational capabilities of the original DVD multimedia data file. If, at S51, the user elects to "burn" the DVD multimedia data file onto a blank optical recording medium, then, at S54, the controller 120 controls the DVD recorder 140 to perform conventional DVD format channel coding and at S55 controls the DVD disc burner 150 to "burn" the DVD multimedia data file onto a blank optical recording medium so that, once the "burning" process has been completed, the user may then remove the recorded optical recording medium 32 from the reproduction apparatus 100 and play that recorded DVD in another DVD player enabling, for example, the user to watch the DVD on a television, home cinema or home entertainment system having, for example, a larger screen and a better sound system than the reproduction apparatus 100.

To avoid compromising security, the decrypted content is not stored locally on the user's computer. Rather, decryption is carried out "just in time" for presentation to the DVD player or for burning of a DVD disc.

As set out above, the DVD authorer 118 of the DVD data producer 107 enables the DVD multimedia data file to be reassembled or reconstituted so that all of its navigation capabilities are retained enabling a user of the reproduction apparatus to use the navigation capabilities of that DVD multimedia data file to, for example, select chapters, select director's cuts, select accompanying featurettes and so on.

As described above, copy protection is added by DVD authorer 12 of the supply apparatus 1. It may, however, be possible for the copy protection to be provided simply at the reproduction apparatus 100, provided that the rights protector 130 can ensure that the user cannot subvert or replace the DVD data producer.

As described above, the copy protection relies on insertion of subversive data and on the copy protector ensuring that there are no navigable paths to these subversive data. Other possibilities for copy protection are described in, for example, WO2004/066294, WO2005/020068, GB2398671, the whole contents of which are hereby incorporated by reference. These copy protection systems may incorporate unbalanced DC content in the DVD multimedia data file. In this case, the copy protector 120 of the reproduction apparatus will be configured to ensure that the reconstituted file contains such unbalanced DVD content so that a user will not be able to "rip" a copy of the copy-protected DVD multimedia data file. Of course, both of the two abovementioned types copy protection could be used. In addition, the copy protector may include a kernel mode device driver on the copy protected DVD, which is loaded when the disc is inserted into a personal computer and acts to support and re-enforce the copy protection due to the subversive data on the disc, and thus prevent ripping of the copy protected burned disc.

As described above, to avoid compromising security, the decrypted content is not stored locally on the user's computer. Rather, decryption is carried out "just-in-time" for presentation to the DVD player or for burning of a DVD disc. As another possibility, however, the user may, depending upon their license terms, be allowed to store the copy-protected reproduced DVD multimedia data file (with the navigational capabilities of the original DVD multimedia data file) for later playback or for later burning to disc.

The above description relates to the current DVD format. It will, of course, be appreciated that the present invention may be applied to any other optical disc recording formats where the format incorporates navigational capabilities so that a user can, for example, select different versions of the same content or navigate between different parts of chapters of the same content similarly. The present invention may also be applicable to magnetic, opto-magnetic or other recording media which may or may not be disc-type recording media.

As described above, the DVD multimedia data file is compressed and stored prior to any request for downloading. Where the time required for such compression is not an issue, it may be possible to carry out the compression only upon receipt of a request to download that file. As described above, a user pays for each download at the time of downloading. It may however be possible for users to be registered or subscribe to the system so that they are billed periodically for their use of the system.

As described above, the reconstituted DVD multimedia data file is in the same format as the original DVD multimedia data file. It may however be possible to reconstitute the file in a different DVD data format.

As described above, the data file is encrypted for supply. This may, however, not be necessary if the network provides a secure link. As another possibility, the compression itself may provide sufficient security.

The system described above enables a user to download over a network multimedia data files that are compressed to reduce the download time and also, depending upon the fee or the terms of the license bought by that user, possibly also to reproduce or reconstitute the original multimedia data file with its navigational facilities in a form that prohibits copying beyond the terms of the license. This license may allow the user to "burn" that file once onto a DVD disc in conventional manner to enable the user to play the thus-recorded DVD in DVD players other than that incorporated in the reproduction apparatus, for example in a DVD player associated with the user's television, home cinema or home entertainment system.

What is claimed is:

1. A data file reproduction system comprising a compressed data file supplying apparatus and at least one reproduction apparatus, wherein
the data file supplying apparatus comprises a receiver and a data compressor, the receiver operable to receive a Digital Versatile Disc (DVD) format data file comprising audio data, video data and meta data, the meta data for enabling navigation of the DVD format data file, the DVD format data file playable by a DVD player, the data file compressor comprising:
a video data extractor operable to extract video data from video data packs of the received DVD format data file;
an audio data extractor operable to extract audio data from audio data packs of the received DVD format data file;
a video data compressor operable to compress the extracted video data into compressed video data packs by using a first compression format that is not lossless, wherein each compressed video data pack includes video data from more than one video data pack of the received DVD format data file and includes at least one flag or marker indicating a location and original size of one of the received video data packs;
an audio data compressor operable to compress the extracted audio data into compressed audio data packs by using a second compression format that is not lossless and different than the first compression format, wherein each compressed audio data pack includes audio data from more than one audio data pack of the received DVD format data file;
a meta data determiner operable to determine meta data from the received DVD format data file, wherein the meta data further includes a mapping between video and audio data packs in the received DVD format file and the compressed video and audio data packs, and is sufficient to reconstitute the video data packs of the received DVD format file, including insertion of padding data;
a data assembler operable to produce a compressed data file in a DVD-like proprietary format containing the compressed audio and video data packs together with non-compressed reconstituting meta data to facilitate reconstitution of the received DVD format data file from the compressed data file and the non-compressed meta data determined from the received DVD format data file for enabling navigation of the reconstituted DVD format data file;
a copy protector operable to copy protect the compressed data file; and
a non-volatile data storage which stores the copy-protected compressed data file
a communicator operable to communicate the copy-protected compressed data file to a remote reproduction apparatus over a network, and wherein
the at least one reproduction apparatus comprises a communicator operable to request the copy-protected compressed data file from the supplying apparatus and a data producer comprising:
a video data decompressor operable to decompress compressed video data packs of the requested copy-protected compressed data file supplied by the supplying apparatus;
an audio data decompressor operable to decompress compressed audio data packs of the requested copy-protected compressed data file supplied by the supplying apparatus;
a video data encoder operable to encode the decompressed video data packs in DVD format;
an audio data encoder operable to encode the decompressed audio data packs in DVD format;
a meta data determiner operable to determine the meta data from the requested copy-protected compressed data file supplied by the supplying apparatus; and
a data assembler operable to produce a copy-protected reconstituted DVD format data file using the non-compressed reconstituting meta data, wherein the copy-protected reconstituted DVD format data file contains the DVD format encoded audio and video data packs together with the non-compressed determined meta data for enabling navigation of the copy-protected reconstituted DVD format data file.

2. A system according to claim 1, wherein the supplying apparatus also comprises a data encrypter operable to encrypt the copy-protected compressed data file to generate an encrypted data file before communication to a reproduction apparatus, wherein the supplying apparatus communicator is operable to communicate a decryption key to the reproduction apparatus and the reproduction apparatus comprises a data decrypter operable to decrypt the requested encrypted data file using the decryption key communicated by the supplying apparatus communicator.

3. A system according to claim 1, wherein the at least one reproduction apparatus includes a compressed data file play enabler operable to enable a DVD format data file player of the reproduction apparatus to play the reconstituted DVD format data file.

4. A system according to claim 1 wherein the at least one reproduction apparatus includes a data file recorder operable to record the reconstituted DVD format data file on a recording medium.

5. A system according to claim 1, wherein the supplying apparatus comprises an authoriser operable to specify whether the reproduction apparatus is authorised to produce a copy-protected reconstituted DVD format data file and the data assembler of the at least one reproduction apparatus is operable to produce the copy-protected reconstituted DVD format data file only in the event that the authoriser indicates that the reproduction apparatus is authorised to produce the copy-protected reconstituted DVD format data file.

6. A system according to claim 1, wherein the at least one reproduction apparatus includes an authenticator operable to authenticate the data assembler of the reproduction apparatus and to permit production of a copy-protected reconstituted DVD format data file only in the event that the authenticator authenticates the data file assembler.

7. A system according to claim 1, wherein the supplying apparatus comprises a license manager operable to specify whether a user of a reproduction apparatus is to have a license or permission to produce a copy-protected data file and to provide the reproduction apparatus with permission to produce the copy-protected data file only in the event that the user has the license or permission to produce the copy-protected data file.

8. A system according to claim 1, wherein the copy protector is operable to add subversive data for copy protecting the compressed data file.

9. A system according to claim 1, wherein the video data extractor is operable to decode MPEG 2 video data packs and the audio data extractor is operable to decode DVD format audio data packs.

10. A system according to claim 1, wherein the video data compressor is operable to compress the decoded video data packs to MPEG 4 format and the audio data compressor is operable to compress the decoded audio data packs to WMA format.

11. A data file supplying apparatus comprising a receiver and a data file compressor, the receiver operable to receive a Digital Versatile Disc (DVD) format data file comprising audio data, video data and navigation data, the navigation data for enabling navigation of the DVD format data file, the DVD format data file playable by a DVD player, the data file compressor comprising:
    a video data extractor operable to extract video data from video data packs of the received DVD format data file;
    an audio data extractor operable to extract audio data from audio data packs of the received DVD format data file;
    a video data compressor operable to compress the extracted video data into compressed video data packs by using a first compression format that is not lossless, wherein each compressed video data pack includes video data from more than one video data pack of the received DVD format data file and includes at least one flag or marker indicating a location and original size of one of the received video data packs;
    an audio data compressor operable to compress the extracted audio data into compressed audio data packs by using a second compression format that is not lossless and different than the first compression format, wherein each compressed audio data pack includes audio data from more than one audio data pack of the received DVD format data file;
    a navigation data determiner operable to determine navigation data from the received DVD format data file;
    a assembler operable to produce a compressed data file in a DVD-like proprietary format containing the compressed audio and video data together with non-compressed reconstituting meta data for reconstituting the received DVD format data file from the compressed data file and the non-compressed navigation data for navigating the reconstituted DVD format data file, wherein the meta data includes a mapping between video and audio data packs in the received DVD format file and the compressed video and audio data packs, and is sufficient to reconstitute the video data packs of the received DVD format file, including insertion of padding data;
    a copy protector operable to copy protect the compressed data file;
    a non-volatile data storage which stores the copy-protected compressed data file; and
    a communicator operable to communicate the copy-protected compressed data file over a network to a remote apparatus.

12. An apparatus according to claim 11, further comprising an authoriser operable to specify whether the remote apparatus is authorised to receive the compressed data file and to allow the communicator to communicate the compressed data file only in the event that the remote apparatus is to be so authorised.

13. An apparatus according to claim 11, further comprising an license determiner operable to specify whether the remote apparatus is authorised to produce a copy-protected reconstituted DVD format data file and to authorise production by the remote apparatus of the copy-protected reconstituted DVD format data file only in the event that the remote apparatus is to be so authorised.

14. An apparatus according to claim 11, further comprising a data encrypter operable to encrypt a compressed data file before communication to the remote apparatus, the communicator being operable to communicate a decryption key to the remote apparatus separately from the encrypted compressed data file.

15. An apparatus according to claim 11, wherein the copy protector is operable to add subversive data for copy protecting the compressed data file.

16. An apparatus according to claim 11, wherein the video data extractor is operable to decode MPEG 2 video data packs and the audio data extractor is operable to decode DVD format audio data packs.

17. An apparatus according to claim 11, wherein the video data compressor is operable to compress the decoded video data packs to MPEG 4 format and the audio data compressor is operable to compress the decoded audio data packs to WMA.

18. A method of supplying a copy-protected compressed data file, the method comprising:
    receiving a Digital Versatile Disc (DVD) format data file comprising audio data, video data and meta data, the meta data for enabling navigation of the DVD format data file, the DVD format data file playable by a DVD player;
    extracting video data from video data packs of the received DVD format data file;
    extracting audio data from audio data packs of the received DVD format data file;

compressing the extracted video data into compressed video data packs by using a first compression format that is not lossless, wherein each compressed video data pack includes video data from more than one video data pack of the received DVD format data file and includes at least one flag or marker indicating a location and original size of one of the received video data packs;

compressing the extracted audio data into compressed audio data packs by using a second compression format that is not lossless and different than the first compression format, wherein each compressed audio data pack includes audio data from more than one audio data pack of the received DVD format data file;

determining meta data from the received DVD format data file;

producing a compressed data file in a DVD-like proprietary format containing the compressed audio and video data together with non-compressed reconstituting meta data to facilitate reconstitution of the received DVD format data file from the compressed data file and the non-compressed meta data for enabling navigation of the reconstituted DVD format data file, wherein the meta data includes a mapping between video and audio data packs in the received DVD format file and the compressed video and audio data packs, and is sufficient to reconstitute the video data packs of the received DVD format file, including insertion of padding data;

copy protecting the compressed data file;

storing the copy-protected compressed data file in a non-volatile data storage; and transmitting the copy-protected compressed data file over a network to a remote apparatus with reproduction conditions that specify whether the remote apparatus is to be allowed to reconstitute a copy-protected version of the DVD format data file.

19. The apparatus according to claim 11, wherein the second compression format is Ogg Vorbis or Windows Media Audio, and the first compression format is MPEG4 or DIVX.

20. The method according to claim 18, wherein the second compression format is Ogg Vorbis or Windows Media Audio, and the first compression format is MPEG4 or DIVX.

21. A non-transitory computer readable storage medium storing the copy-protected compressed data file produced by the method of claim 11.

* * * * *